Figure 1:
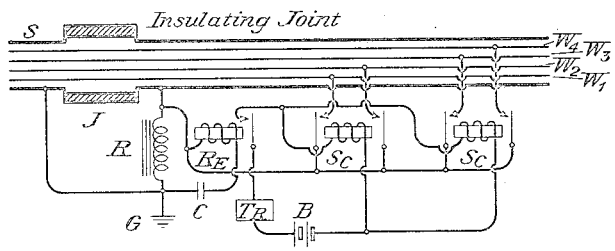

INVENTORS
R. K. Honaman, L. S. Inskip and
L. K. Swart
BY
ATTORNEY

Patented Apr. 21, 1936

2,037,859

UNITED STATES PATENT OFFICE 2,037,859

PROTECTIVE SYSTEM FOR CABLE CIRCUITS

Richard Karl Honaman and Leonard S. Inskip, Bloomfield, and Leland Kasson Swart, Mountain Lakes, N. J., assignors to American Telephone and Telegraph Company, a corporation of New York Application January 30, 1934, Serial No. 709,050

6 Claims. (Cl. 179—78)

This invention relates to electrical protective systems. More particularly, this invention relates to arrangements for simultaneously grounding a plurality of cable circuits when induced voltages become impressed thereon.

A multiplicity of protector blocks, each having an air-gap which breaks down at a predetermined potential, have heretofore been used in the telephone art for the protection of a multiplicity of telephone circuits from high voltages set up therein, by one or more sources of voltages extraneous to the circuits themselves. The use of protector blocks alone, is a source of considerable difficulty and maintenance cost in that, in general, a few operations of those blocks will result in a permanent ground being established across the air-gap of the protector blocks. This will result in circuit outage and a consequent loss of operating time over those circuits.

In open-wire lines these protector blocks have been shunted by contacts of relays which operate at high speed to cause a short circuit of the protector blocks and a consequent reduction in the burning time, all of which results in an increased life of the protector blocks and a very great reduction in the loss of operating time over those circuits. Not only may open-wire lines be subjected to higher voltages set up from extraneous sources but the circuits enclosed in cable may likewise have such high voltages induced in them for conditions where the cable circuits run parallel to transmission lines at short separations and for considerable lengths. It becomes imperative, therefore, to protect the cable enclosed conductors so that voltages set up between the conductors or between the conductors and the cable sheath may not rise to a hazardous value which might result in serious burns and perhaps fatalities to the personnel working on these cable circuits upon a breakdown of insulation between the conductors or between the conductors and cable sheath.

The invention is intended to provide a protector system for a plurality of cable conductors which will be of simple construction and will be free from the difficulties arising from the use of protector blocks alone, as described herein above.

It is one of the objects of this invention to provide a simultaneous grounding of all the conductors or circuits when an extraneous inductive effect becomes impressed upon any one of the various cable conductors or circuits.

One of the features of this invention lies in the employment of a saturating low-impedance reactor in combination with an alternating current relay, both being common to either a single conductor, or to all of the cable conductors, or to various sections of cable sheath, or common to the cable conductors and sheath or between the cable sheath and the ground.

Figure 2:
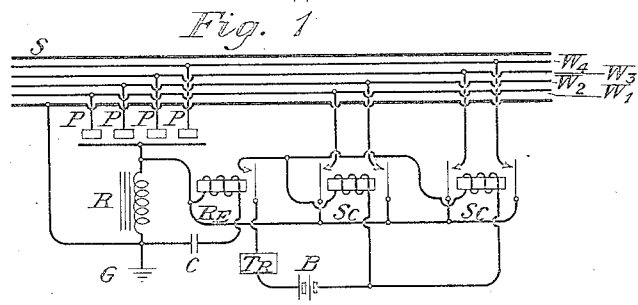
Figure 3:
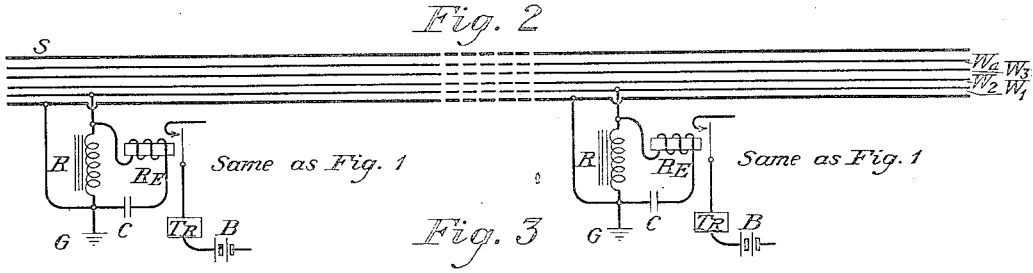
Figure 4:
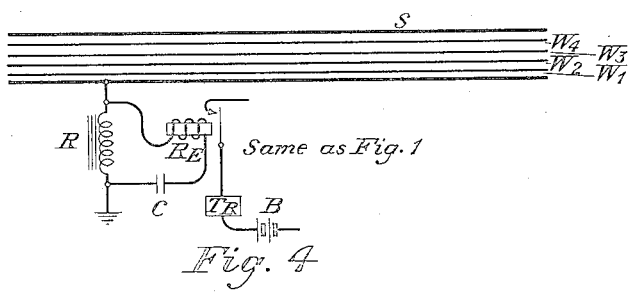
Figure 5:
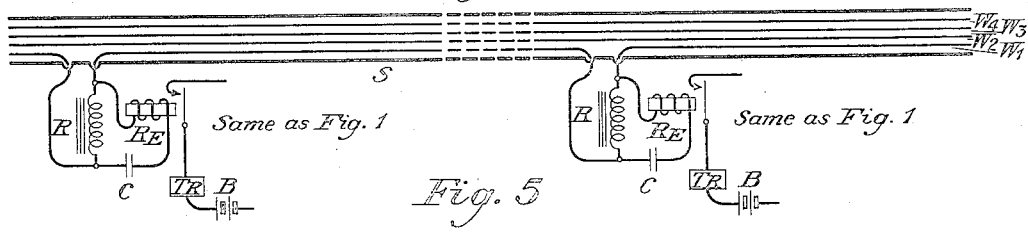

This invention will be better understood from the more detailed description hereinafter following when considered in connection with the accompanying drawing, in Figure 1 of which a protective arrangement is shown for a pair of cable sections separated by an insulating joint; Fig. 2 shows an arrangement including a plurality of protector blocks for the various cable conductors. Fig. 3 shows the protective arrangement applied between one of the cable conductors and the cable sheath; Fig. 4 provides the protective arrangement between the cable sheath and ground, and Fig. 5 shows one of the cable conductors acting as a pilot for the remaining conductors of the cable.

Referring to Fig. 1 of the drawing, the reference characters $W_1$ to $W_4$, inclusive, represent a plurality of four conductors or circuits enclosed within the sheath of a cable. This sheath does, of course, enclose many additional conductors. Each of the four conductors $W_1$ to $W_4$ are connected to the contacts of one of short-circuiting relays $S_c$ as shown. The armatures of these short-circuiting relays are connected to the high potential side of the saturating reactor or transformer R. This saturating reactor or transformer R is connected between two sections of the cable sheath S, this cable sheath being divided into two distinct parts at each protector point along its route by an insulating joint J. The winding of an alternating current relay $R_E$ shunts the saturating reactor or transformer R in series with a condenser C. Condenser C is optional, but if used, it tunes the relay $R_E$ so that its resonance peak appears at the frequency of the disturbing potential. A local source of potential B provides the energy necessary to operate the various short-circuiting relays $S_c$ upon operation of the master alternating current relay $R_E$. The contacts of the relay $R_E$ are closed only during the period in which voltage exceeding the predetermined value required to cause operation of the relay $R_E$ is present in the section bounded by the insulating joint J for each protector point (only one being shown). The contacts of the short-circuiting relays which ground each conductor through the saturating reactor or transformer R are in the operated condition only during the period in which extraneous induced potentials of predetermined magnitude exist.

In Fig. 1, when an extraneous voltage of sufficient magnitude becomes induced in any one of the various sections of cable sheaths, current will pass to ground at each end of the insulated section, causing a potential to be set up in the windings of the reactor or saturating transformer R and causing operation of the master alternating current relay $R_E$. The contacts of said relay $R_E$ cause the operation of all short-circuiting relays $S_c$ associated therewith by virtue of the flow of current from the source of potential B through the thermal relay $T_R$ and the windings of the relays $S_c$ in parallel. The contacts of the short-circuiting relays $S_c$ ground all of the conductors through the saturating reactor or transformer R and also short-circuit each conductor to all other conductors within the cable sheath. The function of the thermal relay $T_R$ will be explained at another point in this specification.

In Fig. 2 the operation of the alternating current relay $R_E$ and the consequent operation of the short-circuiting relays $S_c$ do not start until the voltage induced between any one of the conductors $W_1$ to $W_4$ and sheath S has risen to a magnitude sufficient to break down any one of the open space protector blocks P. Upon the breakdown of one of the protector blocks P current is permitted to pass to ground or to the sheath through the saturating reactor or transformer R, thus providing the necessary potential for the operation of the alternating current relay $R_E$. The contacts of the latter relay connect the battery B to the windings of all of the short-circuiting relays $S_c$ in parallel through the thermal relay $T_R$ and will cause the simultaneous operation of all short-circuiting relays $S_c$. This will bring about the grounding of all conductors $W_1$ to $W_4$ through the saturating reactor R and the extinguishment of the arc across the protector blocks P will promptly ensue. The cable sheath S shown in Fig. 2 is not supplied with insulating joints J, as in Fig. 1, but is continuous throughout.

In Fig. 3 the protective arrangement is somewhat similar to the one shown in Fig. 1, with the exception that the insulating joint or joints J have been done away with, the cable sheath S being continuous throughout. The operation of either of the master relays $R_E$ results from the impression of a sufficiently high potential between a single conductor $W_1$ (which may be called a pilot conductor) enclosed within the sheath S and sheath S itself or between that pilot conductor $W_1$ and ground. As in Fig. 1, the contact of the alternating current relay $R_E$ and the right-hand terminal of the battery B are connected to the windings of a plurality of short-circuiting relays, the contacts of which may be connected to the various conductors $W_1$ to $W_4$ for grounding these conductors through the winding of the saturating reactor.

In Fig. 4 the operation of the master relay $R_E$ results from the existence of sufficiently high potential between the cable sheath S and ground built up across the saturating reactor or transformer R. This arrangement assumes a more or less insulated cable sheath and a low resistance ground at each protector point and depends for protection upon the induced voltage built up between the cable sheath S itself and ground.

In Fig. 5 the operation of the alternating current relay $R_E$ depends upon the voltage set up across the saturating reactor R by virtue of current traversing the pilot conductor $W_4$ within the sheath S of the cable. This current will cause the operation of all protective devices applied to the pilot conductor $W_4$ for the reason that all of these devices are introduced in series relationship with the pilot conductor $W_4$ and are operable by the same current.

In all of the arrangements a thermal relay $T_R$ may be introduced in series with the local battery B and the armature of the relay $R_E$. This relay will periodically open and close the circuit extending to the windings of the short-circuiting relays after a specified interval of time or it may open the battery circuit entirely, if so desired, to avoid total outage of all of the conductors within the cable due to some faulty operation or locked up condition of the relay $R_E$.

It will be understood also that the reactor or transformer R may be bridged by a small condenser or by an element of thyrite in order to readily pass lightning to ground. Moreover, a copper-oxide type of short-circuiting relay protector of well known type may, if desired be used in place of the alternating current relay $R_E$ and reactor or transformer R.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. The combination of a cable sheath composed of a plurality of sections which are spaced from each other, a plurality of insulating joints each connecting two of the sections of the cable, a saturating reactor connected between two adjacent sections of the cable, one end of the saturating reactor being grounded, an alternating current relay having its winding connected across the saturating reactor, and means responsive to the operation of the alternating current relay to simultaneously ground all of the conductors enclosed within the cable through the saturating reactor.

2. Protective apparatus for a cable within the sheath of which are enclosed a plurality of conductors, comprising a saturating reactor, one terminal of which is connected to the cable sheath and grounded, an alternating current relay, the winding of which is connected across the saturating reactor and becomes operated upon the application of an abnormal voltage across the saturating reactor, short-circuiting relay apparatus for simultaneously grounding all of the conductors enclosed within the cable through said saturating reactor, and a thermal relay connected to the short-circuiting relay apparatus, said thermal relay interrupting the operation of the short-circuiting relay apparatus at regular intervals.

3. Protective apparatus for a cable sheath which encloses a plurality of conductors which are exposed to inductive interference, comprising a saturating reactor normally interconnected between the cable sheath and one of the conductors enclosed within said cable sheath, an alternating current relay the winding of which is connected across the saturating reactor, and means responsive to the operation of the alternating current relay for simultaneously grounding all of the conductors enclosed within the cable sheath through said saturating reactor.

4. Protective apparatus for a cable sheath which encloses a plurality of conductors and which is exposed to inductive interference, comprising a saturating reactor normally connected between the cable sheath and ground, an alternating current relay having its winding connected across the saturating reactor, and means responsive to the operation of said alternating current relay for simultaneously grounding all of the conductors enclosed within the cable sheath through said saturating reactor.

5. Protective apparatus for a cable within the sheath of which are enclosed a plurality of conductors, comprising a saturating reactor, one terminal of said saturating reactor being connected both to the cable sheath and to ground, a relay the winding of which is connected across said reactor and becomes operative upon the application of an abnormal voltage across said reactor, short-circuiting relay apparatus for simultaneously grounding all of the conductors within the cable through said saturating reactor, and a thermal relay connected to the short-circuiting relay apparatus and interrupting the operation of said short-circuiting relay apparatus at predetermined intervals.

6. Protective apparatus for a cable sheath which encloses a plurality of conductors and is exposed to inductive interference, comprising a saturating reactor normally connected to the cable sheath and ground, said reactor being external to said cable sheath, a relay having its winding connected across said reactor, and means responsive to the operation of said relay for simultaneously grounding all of the conductors enclosed within the cable sheath through said reactor.

RICHARD K. HONAMAN.
LEONARD S. INSKIP.
LELAND KASSON SWART.